United States Patent [19]

Berger et al.

[11] 4,096,621

[45] Jun. 27, 1978

[54] METHOD OF CONCURRENTLY ROTATING A THREADED FASTENER AND DEFLECTING A LOCKING TAB

[75] Inventors: Richard E. Berger, Pekin; Herbert L. Wahrenburg, East Peoria, both of Ill.

[73] Assignee: Caterpillar Tractor Co., Peoria, Ill.

[21] Appl. No.: 774,369

[22] Filed: Mar. 4, 1977

Related U.S. Application Data

[63] Continuation of Ser. No. 641,462, Dec. 17, 1975, abandoned.

[51] Int. Cl.[2] ............................................ B23P 19/00

[52] U.S. Cl. ................................ 29/526 R; 81/121A

[58] Field of Search ..................... 29/428, 446, 526 R, 29/427; 81/121 A; 151/52, 53

[56] References Cited

U.S. PATENT DOCUMENTS

| | | | |
|---|---|---|---|
| D. 160,267 | 9/1950 | McCammon | 81/121 A X |
| 240,217 | 4/1881 | Allen | 81/121 A UX |
| 502,195 | 7/1893 | Jones | 151/53 |
| 1,077,763 | 11/1913 | Stark | 151/52 |
| 1,327,435 | 1/1920 | Kurtz | 151/53 |
| 1,332,351 | 3/1920 | Murray | 81/121 A UX |
| 1,434,401 | 11/1922 | Mueller | 81/121 A |
| 1,812,319 | 6/1931 | Brumfield | 151/53 X |
| 2,503,364 | 4/1950 | Viets | 81/121 A |

FOREIGN PATENT DOCUMENTS

| | | | |
|---|---|---|---|
| 840,338 | 4/1939 | France | 81/121 A |
| 430,628 | 10/1911 | France | 151/52 |
| 604,812 | 7/1948 | United Kingdom | 81/121 A |

*Primary Examiner*—Charlie T. Moon
*Attorney, Agent, or Firm*—Wegner, Stellman, McCord, Wiles & Wood

[57] ABSTRACT

A method of selectively controlling the threaded disposition of a threaded element having a portion defining a flat side relative to a member having a complementary threaded means, the flat side of the element extending parallel to the axis of the threaded element and being disposed adjacent the member and a tool for use in concurrently rotating a threaded securing element having a flat-sided portion and deflecting away from the element a turned tab of a locking element disposed in the space adjacent one flat side of the element provided to lock the element against rotation. The tool defines a socket having an open portion. The edges of the open portion define tab deflectors.

10 Claims, 3 Drawing Figures

METHOD OF CONCURRENTLY ROTATING A THREADED FASTENER AND DEFLECTING A LOCKING TAB

CROSS-REFERENCE TO RELATED APPLICATIONS

This application comprises a continuation of our application Ser. No. 641,462, filed Dec. 17, 1975, now abandoned, entitled Tool Having Means for Concurrently Rotating A Threaded Fastener and Deflecting a Locking Tab.

BACKGROUND OF THE INVENTION

1. Field of the Invention

This invention relates to controlling the threaded disposition of threaded elements having flat-sided tool-engaging portions, such as nuts or bolts, which may be locked in place by deformable retaining means.

2. Description of the Prior Art

One conventional form of wrench for turning nuts and bolts, or similar flat-sided elements, comprises a socket. Such sockets are conventionally defined by an annular wall member having a plurality of fastener-engaging portions arranged in a polygonal array corresponding to the polygonal array of the flat sides of the element to be turned. One conventional form of such array is a hexagonal array wherein six flat sides are provided on the element, each extending approximately 60°.

Different forms of such sockets are conventionally provided. In one conventional form, the socket is provided with a recess for receiving the fastening element, having a plurality of flat sides corresponding to the flat sides of the fastening element. The flat sides meet at the corners of the polygonal array. When such a socket is placed over the flat-sided fastening element and rotated, the socket wall surfaces engage the element at each flat side thereof to permit a turning of the fastening elements by the application of a suitable torque.

In one modified form of such a socket, as disclosed in U.S. Pat. No. 3,273,430, of Raymond G. Knudsen et al., a somewhat rounded configuration is provided in the socket wall surfaces so as to permit the socket to make contact on the side, or flank, of the nut or bolt, for effecting the driving engagement at the position spaced away from the corner portions of the fastener.

It is further conventional in the utilization of such fastener elements to provide locking means for effectively precluding undesirable loosening of the fastening as from vibration or the like. One conventional means for preventing such loosening comprises a lock washer, there being many different configurations of lock washers provided for such functioning.

Another conventional form of rotation-preventing means comprises flat metal locks. Such locks are conventionally defined by a piece of flat metal having opposed tab portions. One tab portion is adapted to be bent downwardly about an edge of the part being fastened. The opposite tab portion is adapted to be bent upwardly to be disposed in the space adjacent one flat side of the fastening element so as to interfere with the turning of the element, thereby effectively locking the element against rotation in the fastened condition. The lock further includes a central opening through which the male threaded element extends. Thus, the flat metal lock may be broadly defined as a washer having deflectible tabs one of which is adapted to be engaged with the workpiece and one of which is adapted to be disposed to block rotation of the fastening element.

SUMMARY OF THE INVENTION

The present invention is concerned with the problem of deflecting the rotation-preventing tab of such flat metal locks suitably to permit rotation of the fastening element when desired. It is conventional to effect such deflection by utilization of a punch or the like suitably manipulated to deflect the tab away from the flat side of the fastening element sufficiently to permit subsequent rotation of the element as desired. The use of such deflecting means is relatively time-consuming, tedious and expensive and is particularly vexatious where a large number of fastening elements must be adjusted or replaced from time to time, such as in engine mountings, transmissions and the like.

The present invention comprehends a novel and simple method of and means for effecting such tab deflection, eliminating the time-consuming and expensive separate deflection operation of the prior art in a novel and simple manner. More specifically, the present invention comprehends an improved method effecting a concurrent deflection of the tab with a rotation of the threaded securing element. Thus, in effect, the rotation of the securing element may be effected by the same general type of operation required to rotate the securing element in the absence of such a flat metal lock-type locking means.

More specifically, the tool of the present invention comprises a wall member defining a wrench portion and shoulder means adjacent the wrench portion disposed to deflect the locking tab away from the securing element concurrently with movement of the wrench portion in engagement with the securing element to effect rotation of the securing element.

More specifically, the wrench portion may comprise a socket. The socket may be provided with an open side portion, with the opposite edges of the socket defining the opposite sides of the open portion comprising deflecting surfaces for engaging the locking element tab as a result of rotation of the wrench portion in engagement with the securing element.

The provision of the deflecting edges at opposite sides of the open portion permits the use of the tool to effect desired deflection of the locking tab in either direction of rotation of the fastening element, i.e., either in a clockwise direction or a counterclockwise direction whereby the deflection of the tab may be effected both for tightening of the fastening element or loosening of the fastening element, as desired.

In the illustrated embodiment, the open portion of the socket extends sufficiently to accommodate the tab of the flat metal lock. As the tabs conventionally extend substantially the width of the flat side of the fastening element, the open portion of the socket may correspondingly extend substantially the width of the fastening element side.

In one form of the invention, the edge surfaces of the socket open portion are coplanar, being defined by a chord of a circle centered on the axis of the socket.

The edge surfaces may extend parallel to the axis, or may be inclined thereto, as desired.

The edge surfaces may extend angularly to the axial extent of the socket, as desired.

The socket may define a plurality of fastener-engaging surfaces arranged in a polygonal array corresponding to the array of the flat sides of the fastener element.

The socket may be provided with rounded corner surfaces between the element-engaging surfaces.

In one form, the socket may be defined by a plurality of planar surfaces in an array corresponding to the array of the fastener flat sides.

Thus, the tool of the present invention is extremely simple and economical of construction while yet providing the highly desirable advantages discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
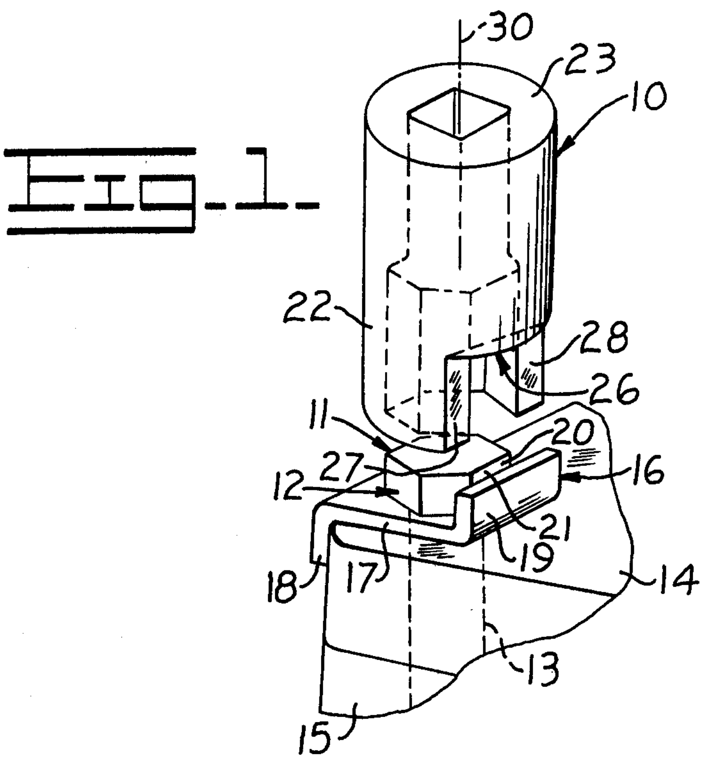
FIG. 1 is a fragmentary perspective view of a tool embodying the invention in relationship to a threaded securing element being retained against turning by a conventional flat metal lock.

In the exemplary embodiment of the invention as disclosed in the drawing, a tool generally designated 10 is shown to comprise a socket for use in turning a fastening element generally designated 11 having a flat-sided portion generally designated 12. In the illustrated embodiment, element 11 comprises a bolt having a flat-sided head 12 and a threaded portion 13 such as for use in securing together a pair of workpieces 14 and 15.

Fastener 11 may be retained against rotation by a suitable locking means. In the illustrated embodiment, the locking means comprises a conventional flat metal lock generally designated 16 having an apertured mid-portion 17 through which threaded portion 13 of the bolt extends. Lock 16 further includes a first tab 18 which may be downturned about one edge of the workpiece 14, and a second tab 19 which may be upturned to be disposed in the space generally designated 20 adjacent one face 21 of the flat-sided portion 12 of the fastening element so as to prevent rotation of the fastening element.

The downturning of tab 18 and the upturning of tab 19 may be effected in the conventional manner as by means of a conventional hammer and punch operation, as is well known in the art.

As indicated briefly above, to effect a desired turning of the fastening element 11 subsequent to the locking thereof by the upturning of tab 19, it has heretofore been necessary to effect a downward deflection of the tab as by a suitable hammer and punch operation. Such deflection operations are relatively time-consuming, tedious and costly. The present invention contemplates an arrangement of tool 10 such that both a rotation of the fastening element and a deflection of the locking tab are effected concurrently by a single rotational operation of the tool.

More specifically, tool 10 includes a wrench portion, or socket, 22 and a manipulating portion 23. The socket 22 defines an annular wall member having a recess generally designated 24, in turn defined by a plurality of planar surfaces 25 arranged in a polygonal array corresponding to the polygonal array of the flat sides of the fastener portion 12. Thus, the socket is adapted to embrace the fastener portion 12, as best illustrated in FIG. 3.

As shown in FIG. 1, one portion generally designated 26 of socket 22 is open. As shown in FIG. 3, the open portion 26 may extend substantially the width of the fastener side 21 so as to accommodate the upturned tab 19 when the socket is engaged with the fastener portion 12.

Figure 3:
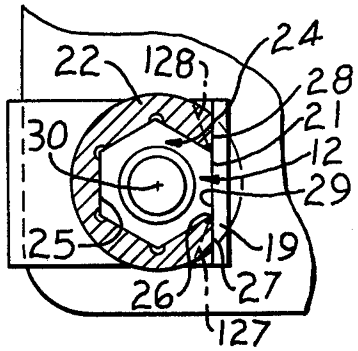
FIG. 3 is a fragmentary horizontal section taken substantially along the line III—III of FIG. 2.

The annular wall defining the socket further defines a pair of edge surfaces 27 and 28 at the opposite sides of open portion 26 which, as shown in FIG. 3, are adapted to engage the inwardly facing surface 29 of the tab 19 when the socket is embracing the fastener portion 12 so that rotation of the tool 10 in either direction, i.e., clockwise or counterclockwise from the position of FIG. 3, effects a deflection of the tab 19 away from space 20 and downwardly toward the upper surface of workpiece 14.

Resultingly, by means of the use of tool 10 as described above, it is unnecessary to effect a preliminary deflection of tab 19 prior to an attempted rotation of the fastener 11. Rather, upon positioning of the socket in embracing relationship to the fastener 11, the tool may be rotated so as to concurrently effect both operations of deflection of the locking tab 19 and rotation of the fastening element. As the edges 27 and 28 are disposed at opposite sides of the tab, this operation may be effected in either direction of rotation so that additional tightening of the fastening element may be effected or loosening of the fastening element may be effected as desired, with the concurrent deflection of tab 19 being automatically effected as a concomitant of the rotation of the fastening element.

In the illustrated embodiment of FIG. 1, the edge surface 27 and 28 comprise planar surfaces extending parallel to the vertical axis 30 of the tool and in coplanar relationship to each other. As best seen in FIG. 3, the coplanar relationship of the edge surfaces 27 and 28 is defined by a chord of a circle of axis 30 corresponding to the circumference of the socket portion 22.

Figure 2:
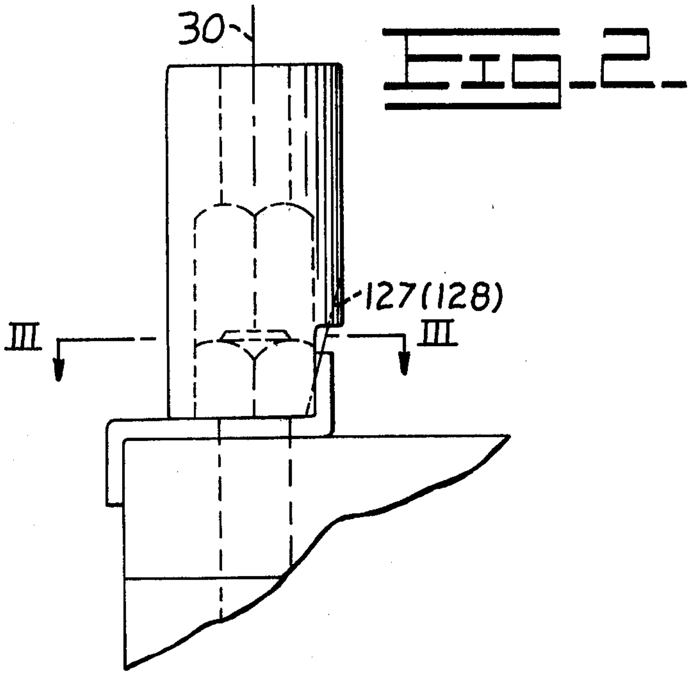
FIG. 2 is a fragmentary side elevation thereof.

As will be obvious to those skilled in the art, modifications of the specific arrangement of the surfaces 27 and 28 may be effected within the scope of the invention. Thus, as illustrated in broken lines in FIGS. 2 and 3, a modified form of deflection surfaces 127 and 128 may be provided wherein the deflection surfaces are inclined downwardly to the axis 30 in the longitudinal direction of the tool (see FIG. 2), and may be inclined rearwardly to the circular chord and away from the plane defined thereby, as shown in FIG. 3.

Thus, the invention broadly comprehends the utilization of suitable deflection means at either or both edges of the open portion of the socket with the deflection means being defined by a suitable deflection surface for effecting the desired deflection of tab 19 as a result of the rotation of the socket on the fastening element.

As discussed above, a number of different socket configurations are presently utilized conventionally in the wrench art. As will be obvious to those skilled in the art, any such socket configuration may be utilized in conjunction with the novel deflection means of the present invention, including the flat-sided socket means, the relieved corner socket means, 6 point and 12 point sockets, etc.

Formation of the improved tool 10 is extremely simple. Thus, the improved tool construction of the present invention may be readily formed by suitably removing a portion of a conventional socket structure to form an open portion 26 suitably to accommodate the upturned locking tab, as discussed above. Reduction in the torque strength of the socket as a result of the provision of the open portion has been found to be minimal so that the tool functions substantially similarly to the conventional tool in the fastener-turning operation while yet providing the highly desirable additional concurrent tab-deflecting operation as discussed above.

It should be noted that multiple bolt flat locks wherein all or most tabs are bent one way can accommodate the subject tool equally well.

The foregoing disclosure of specific embodiments is illustrative of the broad inventive concepts comprehended by the invention.

The embodiments of the invention in which an exclusive property or privilege is claimed are defined as follows:

1. The method of selectively controlling the threaded disposition of a threaded element having a turning portion defining an array of flat sides relative to a member having a complementary threaded means, said flat sides of said element extending parallel to the axis of the threaded element and being disposed adjacent said member, comprising the steps of: fixedly securing a deformable retainer to said member to have a retaining portion of the retainer extend adjacent one of said element flat sides to effectively prevent threaded turning of said element relative to said member; and engaging concurrently a first, camming surface of a tool with said retaining portion and a second, turning surface of the tool with said flat sides of the threaded element other than said one flat side for concurrently separately turning said retaining portion away from said element flat side and causing threaded turning of said element relative to said member without interference by said retainer.

2. The method of selectively controlling the threaded disposition of a threaded element of claim 1 wherein said retaining portion defines a flat surface facially juxtaposed to said element flat side.

3. The method of selectively controlling the threaded disposition of a threaded element of claim 1 wherein said retaining portion defines a flat surface facially abutting said element flat side.

4. The method of selectively controlling the threaded disposition of a threaded element of claim 1 wherein said retainer includes a securing portion secured to said member by said element.

5. The method of selectively controlling the threaded disposition of a threaded element of claim 1 wherein said retainer includes a securing portion having a hole through which a shank portion of said element extends, said securing portion being secured to said member by said element.

6. The method of selectively controlling the threaded disposition of a threaded element of claim 1 wherein said threaded element defines a bolt having a threaded shank threaded to said member threaded means, and a head defining said flat side portion.

7. The method of selectively controlling the threaded disposition of a threaded element of claim 1 wherein said threaded element comprises a nut and said member defines a projecting male threaded portion receiving said nut.

8. The method of selectively controlling the threaded disposition of a threaded element having a turning portion defining an array of flat sides relative to a member having a complementary threaded means, said flat sides of said element extending parallel to the axis of the threaded element and being disposed adjacent said member, comprising the steps of:

fixedly securing a retainer to said member as an incident of said threaded element being threadedly secured to said member;

forcibly deforming a retaining portion of the secured retainer to cause said retaining portion to extend adjacent one of said element flat sides to effectively prevent threaded turning of said element relative to said member; and engaging concurrently a first, camming surface of a tool with said retaining portion and a second, turning surface of the tool with said flat sides of the threaded element other than said one flat side for concurrently separately turning said retaining portion away from said element flat side and causing threaded turning of said element relative to said member without interference by said retainer.

9. The method of selectively controlling the threaded disposition of a threaded element of claim 8 wherein said retainer includes a tab portion and said method includes the step of causing said tab portion to be turned into engagement with said member to lock said retainer against rotational movement by threaded movement of the threaded element.

10. The method of selectively controlling the threaded disposition of a threaded element of claim 8 wherein said tool camming surface is disposed to engage said retaining portion of the retainer as an incident of the turning surface of the tool being engaged with said flat sides of the element whereby releasing deflection of said retaining portion is effected solely by said camming surface of the tool.

* * * * *

UNITED STATES PATENT AND TRADEMARK OFFICE

CERTIFICATE OF CORRECTION

PATENT NO. : 4,096,621

DATED : June 27, 1978

INVENTOR(S) : Richard E. Berger and Herbert L. Wahrenburg

It is certified that error appears in the above-identified patent and that said Letters Patent are hereby corrected as shown below:

Column 5, Claim 5, line 49, after "claim" cancel "1" and substitute therefor --8--.

Signed and Sealed this

*Sixth* Day of *March 1979*

[SEAL]

*Attest:*

RUTH C. MASON
*Attesting Officer*

DONALD W. BANNER
*Commissioner of Patents and Trademarks*